Patented Nov. 24, 1936

2,062,002

UNITED STATES PATENT OFFICE 2,062,002

TREATMENT OF UNSATURATED POLYHALIDES

Herbert P. A. Groll, Oakland, and George Hearne, Berkeley, Calif., assignors to Shell Development Company, San Francisco, Calif., a corporation of Delaware No Drawing. Application April 28, 1934, Serial No. 723,011

27 Claims. (Cl. 260—157)

This invention relates to a novel process for and products of the treatment of unsaturated polyhalides and is more particularly concerned with effecting the reaction of unsaturated polyhalides with a reactant of the class consisting of hypohalogenous acids, aqueous halogen solutions, solutions of a hypohalogenous acid and a hydrogen halide and alkyl or aralkyl hypohalites in the presence of water, whereby polyhalogenated hydroxy compounds and/or polyhalogenated hydrocarbons can be prepared.

For the purposes of the present invention, the term "unsaturated polyhalide" is used to designate a group of unsaturated halides classified as vinyl type polyhalides and allyl type polyhalides. Vinyl type polyhalides, as herein designated, contain at least one olefinic linkage embracing two vicinal unsaturated carbon atoms to which at least two halogen atoms are attached. For example, a compound containing at least one of the groupings

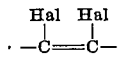

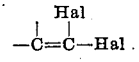

or

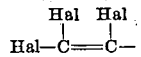

may be classified as a vinyl type polyhalide. The allyl type polyhalides include those unsaturated compounds containing at least one olefinic linkage and at least two halogen atoms, neither of which is attached to either of the unsaturated vicinal carbon atoms embraced in the olefinic linkage.

The unsaturated polyhalides employed in the execution of our process contain at least two halogen atoms and at least one olefinic linkage comprised in an iso or normal alkyl chain which chain may or may not be attached to a cyclic radical as of the aromatic, alicyclic or heterocyclic series, or the chain may comprise an alicyclic structure.

In the execution of our process, the selected type of unsaturated polyhalide is caused to react with a hypohalogenous acid or equivalent reactant. With vinyl type polyhalides, the principal reaction comprises addition of halogen to the double bond whereby further halogenated compounds are obtained. The allyl type polyhalides react with a hypohalogenous acid or an equivalent reactant yielding polyhalogenated hydroxy compounds as the main reaction products.

These compounds may be considered as polyhalogenated secondary or tertiary alcohols, depending on the character of the vicinal unsaturated carbon atoms embraced in the unsaturated polyhalide reacted. When one of the vicinal unsaturated carbon atoms is tertiary, the main product is a polyhalogenated tertiary alcohol. When the unsaturated polyhalide comprises one of the groupings:

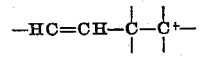

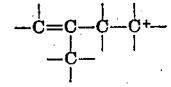

or

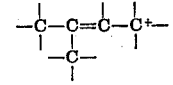

wherein the carbon atom represented by C+ is of quaternary or tertiary character in a cyclic or open chain structure, the main reaction involves substitution of halogen for hydrogen in the molecule and in some cases halogen is added to the double bond.

When a hypohalogenous acid is employed, this reactant may be prepared by any of the suitable methods known to the art. A convenient method consists in dissolving a halogen in water; the halogen on hydrolysis yields a hypohalogenous acid and hydrogen halide. If the solution is effected in the presence of weakly basic neutralizing agents such as sodium bicarbonate, mercuric oxide, calcium carbonate, etc., the hydrogen halide may be neutralized and substantially concentrated hypohalogenous acid solutions prepared. Hypohalogenous acids may also be conveniently prepared by the electrolysis of metal halides and hydrogen halides, by the treatment of metal hypohalites with dilute acids and by the decomposition of organic hypohalites in the presence of water.

In a preferred mode of execution of our process, we prepare a hypohalogenous acid by dissolving a halogen in water. When a halogen dissolves in water, a mobile equilibrium is established which may be represented by the equation:

We have observed that the rate of reaction of the unsaturated polyhalide with free halogen is greater than the rate of reaction of the polyhalide with a hypohalogenous acid in solution; therefore the presence of undissolved halogen favors side reactions. In cases where it is desirable to avoid these side reactions we prefer to operate in such a manner that the contact of the unsaturated polyhalide with substantial amounts of undissolved halogen is avoided. This may be accomplished by preparing the halogen solution in a separate absorption stage prior to effecting contact with the unsaturated polyhalide in a reaction stage. The presence of hydrogen halide in the aqueous halogen solution in concentrations up to about 1.5 normal does not result in the substantial reaction of the former with the unsaturated polyhalide or main reaction product thereof and has no known appreciable detrimental effect on the desired course of the reaction. The aqueous solution of halogen may be prepared by any suitable known means. If the halogen such as chlorine and bromine is employed in the gaseous or liquid state, the solution is readily effected by means of a concurrent or countercurrent absorption system.

We have found that the optimum concentrations of hydrogen halide and of hypohalogenous acid in the reaction vessel depend upon the nature of the reactants as well as the reaction product desired. Thus to avoid undesirable side reactions leading to saturated halides, we prefer to work with lower hydrogen halide concentrations when treating unsaturated chloride containing an unsaturated tertiary carbon atom than when the unsaturated chloride does not possess such an unsaturated tertiary carbon atom. For example, when the chloride treated possesses an unsaturated tertiary carbon atom, we prefer to keep the hydrochloric acid concentration at or below 0.7 normal, while with compounds not containing an unsaturated tertiary carbon atom we prefer to operate at or below a maximum hydrochloric acid concentration of 1.5 normal. We also found that we may advantageously employ higher concentration of hydrochloric than of hydrobromic acid, while with hydroiodic acid the concentration is preferably kept lowest.

We generally keep the concentration of hypochlorous acid or chlorine in the reaction vessel proper below 0.1 normal and we prefer to work at an apparent optimum between 0.005 normal and 0.015 normal. We have found that we may use bromine and iodine and the corresponding hypohalides in considerably higher concentrations without lowering the yield of the desired reaction product.

However, when treating unsaturated halides containing an unsaturated tertiary carbon atom with an aqueous solution of chlorine or hypochlorous acid, we found that we can control the relative amounts of useful products formed by regulating the concentration of the chlorhydrinating agent. If we employ concentrations between 0.005 normal and 0.01 normal, we almost exclusively obtain as the reaction product a tertiary alcohol containing one more chlorine atom than was possessed by the unsaturated halide treated. However, when concentrations of hypochlorous acid or chlorine above 0.01 normal and preferably between 0.015 normal and 0.025 normal are employed, we may obtain as valuable by-products tertiary alcohols containing at least two more chlorine atoms than the original unsaturated halide.

Our process is adaptable to treatment of gaseous, liquid or solid unsaturated polyhalides. Under the preferred operating temperatures and pressures, the reaction of the majority of unsaturated polyhalides will be effected in the liquid phase. The reaction may be effected by bringing the reactants into contact in any suitable reaction stage. To insure intimate contact of the reactants, it is desirable that the reaction vessel be equipped with suitable agitating or concurrent or countercurrent contacting means. In certain cases, more efficient contact is obtained by the addition of certain organic substances which may or may not be inert to the reactants such as alcohols, ethers, esters, hydrocarbons, halogenated hydrocarbons, etc. The order of introduction of the reactants may be varied to suit the particular reactants and apparatus employed. It is desirable, in a good many cases, that the unsaturated polyhalide be in excess of the hypohalogenous acid in the reaction vessel.

The general reaction of an organic ester of a hypohalogeneous acid with an unsaturated polyhalide in the presence of water may be illustrated by the following specific reaction of 3,3-dichloro propene-1 and tertiary butyl hypochlorite whereby 1,3,3-trichloro propanol-2 and tertiary butyl alcohol are obtained.

The primary, secondary and tertiary alkyl or aralkyl esters of hypochlorous and hypobromous acids are the most suitable organic hypohalites adaptable to this mode of execution of our process. If desired, mixed alkyl hypohalites may be employed in which case mixed alcohols are obtained as by-products. The alcohols obtained as by-products may be utilized in mixture or solution with the main reaction product for solvent purposes, intermediates and the like, or the separation of the constituents from each other and water effected by suitable means such as selective extraction, distillation, stratification and the like. The recovered unhalogenated alcohols may, if desired, be reutilized in the preparation of organic hypohalites.

Our process may be executed at any desired temperature depending on the stability and character of the reactants employed and the reaction products resulting therefrom. In the majority of cases, we prefer to operate at about room temperature. When the unsaturated polyhalide or reaction product thereof is or are easily oxidized or otherwise undesirably affected, it is of advantage to operate at temperatures substantially below 20° C. Moderately elevated temperatures and shorter times of contact of the reactants may be employed when it is of advantage to accelerate the reaction, but we have observed that at higher temperatures undesirable side reactions are favored. In the majority of cases, it is desirable to operate at atmospheric pressure, however, when warranted by the reactants, temperature and particular operating conditions chosen, subatmospheric or superatmospheric pressures may be employed.

The product, the nature of which is dependent on the type and structure of the unsaturated polyhalide reacted, may be intermittently or continuously withdrawn from the reaction vessel in a mixture, solution or suspension with unreacted polyhalide, water or other inorganic or organic bodies which may be present. The product may be recovered by a suitable method as by stratification, extraction, distillation and the like. When separation is effected by distillation the product may be recovered as a constant boiling mixture or mixtures which may comprise unreacted polyhalide, water, alcohol and other substances such as solvents and dehydrating agents which may be present. The unreacted polyhalide may be recovered and reutilized.

The following examples are introduced for the purpose of illustrating the mode and conditions of operation of our process wherein certain specific reactants are employed.

Example I

The process was executed in a cyclic system consisting of a suitable reaction chamber, a separator stage for breaking up emulsions in the liquid leaving the reaction vessel and an absorption column wherein circulating water is saturated with chlorine and introduced into the reaction chamber.

The apparatus was charged with 5000 c. c. of water, 100 c. c. of carbon tetrachloride and 100 c. c. of 1,4-dichloro-2(chloro methyl)-butene-2 of the formula

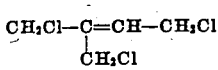

While the liquids were violently agitated in the reaction vessel and the water caused to circulate through the system, gaseous chlorine was continuously introduced into the lower portion of the countercurrent halogen absorption column at a rate of about 20 to 25 grams of chlorine per hour. 1,4-dichloro-2(chloro methyl)-butene-2 was intermittently admitted to the reaction chamber at a rate of about 48 grams per hour. After about 18 hours of continuous operation, a total of 400 grams of chlorine and 865 grams of 1,4-dichloro-2(chloro methyl)-butene-2 had been introduced into the system. A sample of the circulating aqueous solution was withdrawn and its hydrogen chloride content determined. The hydrogen chloride concentration was found to be about 1.13 N. The operation was continued in the same manner for an additional 12 hours, but during this time water was continuously introduced into the system at a rate of about 250 to 300 grams per hour for the purpose of keeping the hydrogen chloride content at or below about 1.13 N. Portions of both liquid phases present in the reaction chamber were withdrawn from the system whenever necessary to maintain the volume of liquid in the system substantially constant. In about 32 hours of continuous operation, 1440 grams of trichloro isoamylene and 675 grams of chlorine had been introduced into the system.

When the operation was discontinued, the liquid was removed from the system and permitted to stratify into two liquid phases. The aqueous phase was extracted with ethyl ether and the resulting ether solution combined with the previously separated lower phase. The resulting mixture of ether, carbon tetrachloride and reaction products was dried and distilled. The bulk of the ether and carbon tetrachloride were removed at atmospheric pressure. The product was distilled under a reduced pressure.

The product was identified as a tetrachloro tertiary amyl alcohol having the probable formula

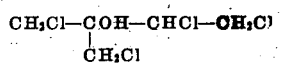

The product was obtained in a yield of about 85%.

Example II 125 grams of 1-chloro-2(chloro methyl)-propene-2 of the formula

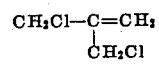

and 200 grams of water were placed in a flask equipped with a stirrer. While this mixture was rapidly stirred, 109 grams of tertiary butyl hypochlorite were intermittently added. When all the tertiary butyl hypochlorite had been added, the liquid was removed from the flask, dried and fractionated. The main reaction products were tertiary butyl alcohol and a trichloro tertiary butyl alcohol of the probable formula

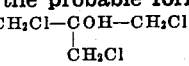

The 1,3-dichloro-2(chloro methyl)-propanol-2 which was obtained in a yield of about 90% boiled at about 90° C. under a pressure of about 4.0 mm. of mercury.

Example III

A mixture consisting of 18 grams of dichloro diisobutenyl of the formula

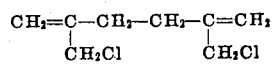

and 100 grams of water was rapidly stirred while 75 c. c. of a 1.33 N solution of hypochlorous acid was slowly added. The reacted mixture was extracted with benzene. The resulting benzene solution was dried and distilled under reduced pressure. When all of the benzene had been removed a heavy residue remained in the flask. Analysis showed the product to be mainly 1,6-dichloro-2,5(chloro methyl)-hexandiol-2,5 having the formula

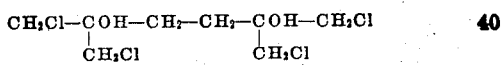

This presents a novel method of producing symmetrical polyhalogenated polyhydric alcohols.

Example IV

The apparatus and method of procedure in this example were essentially the same as described in Example I.

In about 4.5 hours of continuous operation, a total of 4.0 mols of trichloroethylene of the formula CHCl=CCl₂ and 1.8 mols of chlorine were introduced into the system. The liquid, existing in two liquid phases, was withdrawn from the system, stratified and the non-aqueous layer separated, dried and fractionated.

The product, which boiled at about 159-160° C. was identified as pentachlorethane having the formula CHCl₂—CCl₃. 1.7 mols of pentachlorethane were obtained.

Example V 396.3 grams of dichloro diisobutylene of the probable formula

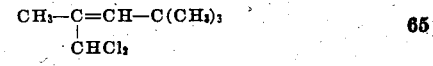

and 2500 c. c. of water were stirred in a flask while about 2.0 mols of chlorine gas were slowly added. When the reaction was complete, the aqueous reaction mixture was allowed to stratify and the two liquid phases separated. The aqueous phase was found to contain 2.0 mols of hydrogen chloride. The non-aqueous phase was fractionated under a reduced pressure. About 210 c. c. of a product were obtained.

The product was found to have the composition:

| | Percent |
|---|---|
| Carbon | 44.6 |
| Hydrogen | 6.0 |
| Chlorine | 49.4 |
| | 100.0 |

These results showed the product to be a trichloride of the formula $C_8H_{13}Cl_3$. It is evident that the main reaction was substitution of halogen for hydrogen. No trace of a chloro alcohol was found.

Example VI 125 gm. of dichloro isobutylene of the formula

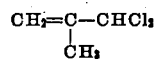

were suspended in a 20 liter glass lined kettle containing 2,000 c. c. of ice water. A 0.1 N. ice cooled normal HOBr solution was added to the rapidly stirred emulsion so slowly that the HOBr in the reaction mixture was never more concentrated than 0.01 N. When 10 liters of the HOBr solution had been added the mixture was extracted with carbon tetrachloride and the extract distilled under vacuum. 133 gm. of dichloro monobromo tertiary butyl alcohol

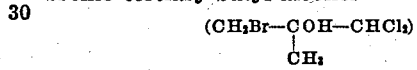

were recovered.

In accordance with the present invention, we may prepare a novel class of polyhalogenated tertiary alcohols containing at least three halogen atoms, not more than two of said halogen atoms being attached to the same carbon atom.

The process can be executed in a batch, intermittent or continuous manner. The reaction may be effected in one or a plurality of reaction stages. In a cyclic system comprising a reaction stage or stages and one or more halogen absorption stages in communication with the reaction stages, the hydrogen halide and/or hypohalogenous acid concentration can be kept below a certain predetermined maximum by the intermittent or continuous addition of water to the system; the volume of liquid being kept substantially constant in the system by the intermittent or continuous withdrawal of product and/or aqueous solution from the reaction stage or stages.

In certain cases where unsaturated polyhalides are obtained in mixtures comprising more than one species or type of polyhalide, such a mixture or solution may be utilized without resorting to separation of the constituents. The reaction products may be utilized in mixtures or solution for solvent, preparative and the like purposes, or separation effected by any suitable means such as fractionation, stratification, centrifugation, extraction, etc.

The products obtained in the execution of our process may be utilized as solvents and extractants in numerous extraction, purification, refining and recovery processes, such as for refining of mineral oils, purification of refinery and manufactured gases and the like. The polyhalogenated tertiary alcohols may be hydrolyzed and polyhydric alcohols, which may or may not be halogenated, obtained. The polyhalogenated alcohols may be utilized as basic materials for the production of oxides, epihalohydrins, ethers, esters and like compounds.

While we have in the foregoing described in some detail the preferred embodiment of our invention and some variants thereof, it will be understood that this is only for the purpose of making the invention more clear and the invention is not to be regarded as limited to the details of operation, nor is it dependent on the soundness or accuracy of the reasons advanced for the advantageous results obtained. On the other hand, the invention is to be regarded as limited only to the terms of the accompanying claims, in which it is our intention to claim all novelty inherent therein as broadly as is possible in view of the prior art.

We claim as our invention:

1. A process for the production of useful products from unsaturated polyhalides which comprises reacting a non-vinylic unsaturated polyhalide containing an olefinic linkage between two aliphatic carbon atoms with a reactant of the class consisting of the hypohalogenous acids, aqueous solutions of a halogen, solutions of hypohalogenous acids with hydrogen halides, and organic hypohalites.

2. A process for the production of useful products from unsaturated polyhalides which comprises reacting a non-vinylic unsaturated polyhalide containing an olefinic linkage between two aliphatic carbon atoms with an aqueous solution of a halogen.

3. A process for the production of useful products from unsaturated polyhalides which comprises reacting a non-vinylic unsaturated polyhalide containing an olefinic linkage between two aliphatic carbon atoms with an organic hypohalite in the presence of water.

4. A process for the production of useful products from unsaturated polyhalides which comprises reacting a non-vinylic unsaturated polyhalide containing an olefinic linkage between two aliphatic carbon atoms at least one of which is tertiary with a hypohalogenous acid.

5. A process for the production of useful products from unsaturated polyhalides which comprises reacting a non-vinylic unsaturated polyhalide containing an olefinic linkage between two aliphatic carbon atoms at least one of which is tertiary with an aqueous solution of a halogen.

6. A process for the production of useful products from unsaturated polyhalides which comprises reacting a non-vinylic unsaturated polyhalide containing an olefinic linkage between two aliphatic carbon atoms at least one of which is tertiary with an organic hypohalite in the presence of water.

7. A process for the production of a polyhalogenated alcohol which comprises reacting a non-vinylic unsaturated polyhalide containing an olefinic linkage between two non-tertiary aliphatic carbon atoms neither of which is once removed from a carbon atom linked to more than two other carbon atoms with a hypohalogenous acid.

8. A process for the production of a polyhalogenated alcohol which comprises reacting a non-vinylic unsaturated polyhalide containing an olefinic linkage between two non-tertiary aliphatic carbon atoms neither of which is once removed from a carbon atom linked to more than two other carbon atoms with an aqueous solution of a halogen.

9. A process for the production of a polyhalogenated tertiary alcohol which comprises reacting a non-vinylic unsaturated polyhalide containing an olefinic linkage between two aliphatic carbon atoms at least one of which is tertiary and more than once removed from any nonvicinal carbon atom linked to more than two other carbon atoms with a hypohalogenous acid.

10. A process for the production of a polyhalogenated tertiary alcohol which comprises reacting a non-vinylic unsaturated polyhalide containing an olefinic linkage between two aliphatic carbon atoms at least one of which is tertiary and more than once removed from any nonvicinal carbon atom linked to more than two other carbon atoms with an aqueous halogen solution.

11. A process for the production of a polyhalogenated tertiary alcohol which comprises reacting a non-vinylic unsaturated polyhalide containing an olefinic linkage between two aliphatic carbon atoms at least one of which is tertiary and more than once removed from any nonvicinal carbon atom linked to more than two other carbon atoms with an organic hypohalite in the presence of water.

12. A process for the production of a polyhalogenated tertiary alcohol which comprises reacting a non-vinylic unsaturated polyhalide of the general formula

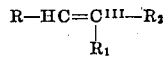

wherein R is a member selected from the group consisting of hydrogen and hydrocarbon and halogenated hydrocarbon radicals linked to the unsaturated carbon atom by a primary carbon atom, and $R_1$ and $R_2$ are radicals selected from the group consisting of hydrocarbon and halogenated hydrocarbon radicals linked to the $C^{III}$ carbon atom by a carbon atom which is not linked to a tertiary or quaternary carbon atom in the radical, R, $R_1$ and $R_2$ together containing at least two halogen atoms, with an aqueous solution of a halogen.

13. A process for the production of a polyhalogenated tertiary alcohol which comprises reacting a non-vinylic unsaturated polyhalide of the general formula

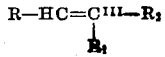

wherein R is a member selected from the group consisting of hydrogen and hydrocarbon and halogenated hydrocarbon radicals linked to the unsaturated carbon atom by a primary carbon atom, and $R_1$ and $R_2$ are radicals selected from the group consisting of hydrocarbon and halogenated hydrocarbon radicals linke to the $C^{III}$ carbon atom by a carbon atom which is not linked to a tertiary or quaternary carbon atom in the radical, R, $R_1$ and $R_2$ together containing at least two halogen atoms, with a hypohalogenous acid.

14. A process for the production of a polyhalogenated tertiary alcohol which comprises reacting a non-vinylic unsaturated polyhalide of the general formula

wherein R is a member selected from the group consisting of hydrogen and hydrocarbon and halogenated hydrocarbon radicals linked to the unsaturated carbon atom by a primary carbon atom, and $R_1$ and $R_2$ are radicals selected from the group consisting of hydrocarbon and halogenated hydrocarbon radicals linked to the $C^{III}$ carbon atom by a carbon atom which is not linked to a tertiary or quaternary carbon atom in the radical, R, $R_1$ and $R_2$ together containing at least two halogen atoms, with an organic hypohalite in the presence of water.

15. A process for the production of a polyhalogenated tertiary alcohol which comprises reacting a non-vinylic unsaturated polyhalide of the general formula

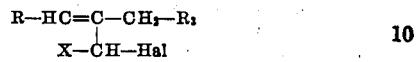

wherein R is a member selected from the group consisting of hydrogen and hydrocarbon and halogenated hydrocarbon radicals linked to the unsaturated carbon atom by a primary carbon atom, $R_3$ is a member selected from the group consisting of hydrogen and hydrocarbon and halogenated hydrocarbon radicals linked to the —$CH_2$— group by a primary carbon atom, and X is a substituent of the class consisting of hydrogen and halogen atoms, at least one of the members R and $R_3$ representing a halogenated hydrocarbon radical when X=H, with an aqueous solution of a halogen.

16. A process for the production of a polyhalogenated tertiary alcohol which comprises reacting a non-vinylic unsaturated polyhalide of the general formula

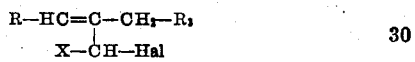

wherein R is a member selected from the group consisting of hydrogen and hydrocarbon and halogenated hydrocarbon radicals linked to the unsaturated carbon atom by a primary carbon atom, $R_3$ is a member selected from the group consisting of hydrogen and hydrocarbon and halogenated hydrocarbon radicals linked to the —$CH_2$— group by a primary carbon atom, and X is a substituent of the class consisting of hydrogen and halogen atoms, at least one of the members R and $R_3$ representing a halogenated hydrocarbon radical when X=H, with an organic hypohalite in the presence of water.

17. A process for the production of a polyhalogenated tertiary alcohol which comprises reacting a non-vinylic unsaturated polyhalide of the general formula

wherein R is a member selected from the group consisting of hydrogen and hydrocarbon and halogenated hydrocarbon radicals linked to the unsaturated carbon atom by a primary carbon atom, $R_3$ is a member selected from the group consisting of hydrogen and hydrocarbon and halogenated hydrocarbon radicals linked to the —$CH_2$— group by a primary carbon atom, and X is a substituent of the class consisting of hydrogen and halogen atoms, at least one of the members R and $R_3$ representing a halogenated hydrocarbon radical when X=H, with an aqueous solution of chlorine.

18. A process for the production of a polyhalogenated tertiary alcohol which comprises reacting a non-vinylic unsaturated polyhalide of the general formula

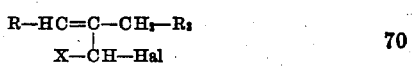

wherein R is a member selected from the group consisting of hydrogen and hydrocarbon and halogenated hydrocarbon radicals linked to the unsaturated carbon atom by a primary carbon atom, $R_3$ is a member selected from the group consisting of hydrogen and hydrocarbon and halogenated hydrocarbon radicals linked to the —$CH_2$— group by a primary carbon atom, and X is a substituent of the class consisting of hydrogen and halogen atoms, at least one of the members R and $R_3$ representing a halogenated hydrocarbon radical when X=H, with an organic hypochlorite in the presence of water.

19. A process for the production of the trichloro tertiary butyl alcohol of the formula $$CH_2Cl—COH—CH_2Cl$$
$$|$$
$$CH_2Cl$$

which comprises reacting the dichloro isobutylene of the formula $$CH_2=C—CH_2Cl$$
$$|$$
$$CH_2Cl$$

with tertiary butyl hypochlorite in the presence of water.

20. A process for the production of the polychlorinated alcohol of the formula $$CH_2Cl—COH—CHCl—CH_2Cl$$
$$|$$
$$CH_2Cl$$

which comprises reacting the trichlor isoamylene of the formula $$CH_2Cl—C=CH—CH_2Cl$$
$$|$$
$$CH_2Cl$$

with an aqueous solution of chlorine.

21. A polyhalogenated tertiary alcohol of the general formula $$R_1—COH—R_4$$
$$|$$
$$R_2$$

wherein $R_4$ is a radical of the group consisting of aliphatic hydrocarbon and aliphatic halogenated hydrocarbon radicals, and $R_1$ and $R_2$ are radicals selected from the group consisting of hydrocarbon and halogenated hydrocarbon radicals, the radicals $R_1$, $R_2$ and $R_4$ together containing at least three halogen atoms and at least two of them being halogenated.

22. A polyhalogenated aliphatic tertiary alcohol of the general formula $$R_1—COH—R_4$$
$$|$$
$$R_2$$

wherein $R_4$ is an aliphatic hydrocarbon radical and $R_1$ and $R_2$ are halogenated hydrocarbon radicals, $R_1$ and $R_2$ together containing at least three halogen atoms.

23. A polyhalogenated tertiary alcohol of the general formula $$R—COH—R_1$$
$$|$$
$$R_2$$

wherein R, $R_1$ and $R_2$ may be the same or different and represent halogenated aliphatic radicals.

24. A polyhalogenated tertiary alcohol of the formula $$Hal—CH_2—COH—CH_2—Hal$$
$$|$$
$$CH_2—Hal$$

25. A polyhalogenated tertiary alcohol of the formula $$Hal—CH_2—COH—CH—Hal—CH_2—Hal$$
$$|$$
$$CH_2—Hal$$

26. The compound $$CH_2Cl—COH—CH_2Cl$$
$$|$$
$$CH_2Cl$$

27. The compound $$CH_2Cl—COH—CHCl—CH_2Cl$$
$$|$$
$$CH_2Cl$$

HERBERT P. A. GROLL.
GEORGE HEARNE.